United States Patent [19]

Brown

[11] 3,730,454
[45] May 1, 1973

[54] STRIPPER MECHANISM
[75] Inventor: Morris E. Brown, Fairport, N.Y.
[73] Assignee: Eastman Kodak Company, Rochester, N.Y.
[22] Filed: June 16, 1971
[21] Appl. No.: 153,656

[52] U.S. Cl. ................................242/192, 242/195
[51] Int. Cl. ...........................G03b 1/30, G03b 1/42
[58] Field of Search....................242/78.6, 78.7, 78.8, 242/192, 195, 197; 352/72, 157, 158

[56] References Cited

UNITED STATES PATENTS 2,273,884  2/1942  Nyberg................................242/78.8

Primary Examiner—Louis R. Prince
Assistant Examiner—John M. Jillions
Attorney—W. H. J. Kline et al.

[57] ABSTRACT

A stripper mechanism which is adapted to cooperate with a supply roll of strip material rotatably supported adjacent the mechanism to separate a leading end of the strip material from the supply roll includes a body portion and a tooth portion. The tooth portion is mounted on the body portion for limited rotation about an axis perpendicular to the axis of rotation of the roll. The body portion of the stripper member is supported for movement from a first location whereat the tooth portion is out of engagement with the roll to a second location whereat the tooth portion is in engagement with the outermost convolution of the strip material on the roll. Being free to rotate relative to the body portion, the tooth portion aligns itself with the plane of the strip material forming the outermost convolution of the roll regardless of the angular build-up of film caused by a single stripe of magnetic material on the film surface, thereby insuring positive, smooth pick-up of the free end of the strip material during film feeding operation.

3 Claims, 5 Drawing Figures

PATENTED MAY 1 1973     3,730,454

MORRIS E. BROWN
INVENTOR.

BY *Milton S. Sales*
*W. H. J. Kline*

ATTORNEYS

STRIPPER MECHANISM

BACKGROUND OF THE INVENTION

1. Field of the Invention

This invention relates to film feeding mechanisms for the movement of film from a reel within a cartridge on a motion picture projector or the like.

2. Description of the Prior Art

Earlier film feeding mechanisms, such as described in coassigned U.S. Pat. No. 3,552,683, entitled CINEMATOGRAPHIC PROJECTORS OR THE LIKE AND CARTRIDGES FOR USE THEREWITH, which issued Jan. 5, 1971 in the names of John J. Bundschuh and Robert J. Roman, include a drive belt which is movable into a cartridge for engaging a roll of film therein for driving the film in an unwinding direction and a stripper finger which is also movable into the cartridge for deflecting the end portions of the film from the roll and into a narrow channel formed by the stripper finger and one reach of the belt. While these earlier mechanisms have proved quite satisfactory in operation, it has been deemed desirable to provide a film stripping mechanism of the same general arrangement which would insure smooth and positive pick-up of the free end of the film when a single magnetic sound stripe has been placed on the film adjacent one edge thereof.

SUMMARY OF THE INVENTION

Accordingly, among the several objects of the invention may be noted the provision of a stripper member having a tooth portion mounted so that it will assume different angular positions when used for stripping film from rolls of film, the different angular positions of the tooth portion corresponding to the angular build-up of the film on the roll caused by single striping. Other objects and advantages of the invention will become more apparent in the detailed description of the preferred embodiment presented below.

In accordance with the above object, a preferred embodiment of the present invention includes a stripper mechanism adapted to cooperate with a supply roll of strip material rotatably supported adjacent the mechanism to separate a leading end of the material from the supply roll. The stripper mechanism includes a stripper member having a body portion and a tooth portion supported on the body portion for at least limited rotation about an axis perpendicular to the axis of rotation of the roll. The stripper member is supported for movement from a first location whereat the tooth portion is out of engagement with the roll to a second location whereat the tooth portion is in engagement with the outermost convolution of the strip material on the roll, whereby the tooth portion will align with the surface of the outermost convolution of the strip material regardless of the angular build-up of strip material.

BRIEF DESCRIPTION OF THE DRAWINGS

In the detailed description of the preferred embodiment of the invention presented below, reference is made to the accompanying drawings, in which:

FIG. 1 is a view illustrating a film stripping and feeding mechanism in accordance with the present invention in its active condition with respect to a roll of motion picture film or the like;

DESCRIPTION OF THE PREFERRED EMBODIMENT

For purposes of illustration, I have shown and described the present invention as used on a cartridge-loading motion picture projector. However, it will be recognized by those skilled in the art, that the present invention is not confined to use on such projectors, and may in fact be used on many other types of apparatus wherein it is desired to separate a leading end of strip material from a roll of such material. Because projectors are well known, the present description will be directed in particular to elements forming part of, or cooperating more directly with, apparatus in accordance with the present invention. It is to be understood that projector elements not specifically shown or described may take various forms well known to those skilled in the art. For specific details of one such projector, reference is made to the above-mentioned U.S. Pat. No. 3,552,683 wherein a motion picture projector in which the present invention may be suitably used is described.

Figure 1:
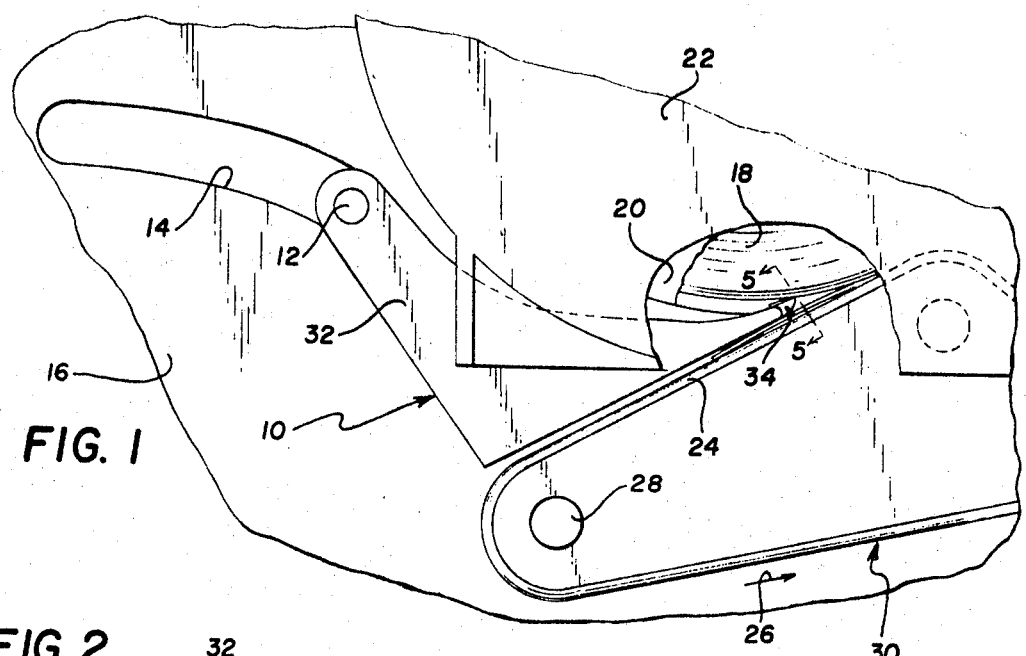

Referring to the drawings, a film stripping and feeding mechanism includes a film stripping finger or member 10 rotatably supported by a pin 12. The pin extends through an arcuate slot 14 in a mechanism plate 16 for moving finger 10 between active and inactive positions respectively in engagement with and away from a roll 18 of film wound on a reel 20 within a cartridge 22 supported on the mechanism plate. Film striping finger 10 is shown in FIG. 1 in its active position in engagement with the outermost convolution of the film. The mechanism for moving the striping finger into and out of engagement with the film roll does not form part of the present invention, and therefore, has not been shown. Details of one such mechanism can be seen in U.S. Pat. No. 3,552,683.

An endless belt 24 is trained about three pulleys, not shown, and is driven in the direction indicated by arrow 26 by a shaft 28. The belt forms part of a drive member 30 which can be swung about the axis of shaft 28 from an inactive position, not shown, through an opening in cartridge 22 and into its active position shown in FIG. 1 whereat it is in engagement with the outermost convolution of film on reel 20 to drive the film roll in an unwinding (clockwise) direction. Means for driving the belt and for swinging it to its active position are disclosed in more detail in the beforementioned coassigned patent.

Figure 2:
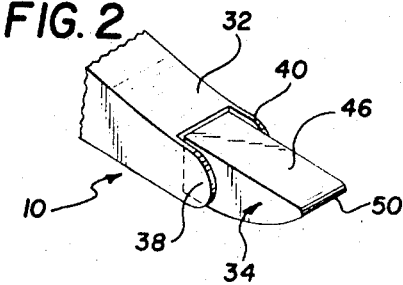
FIG. 2 is an enlarged perspective view of a portion of a film stripper finger shown in FIG. 1.
Figure 4:
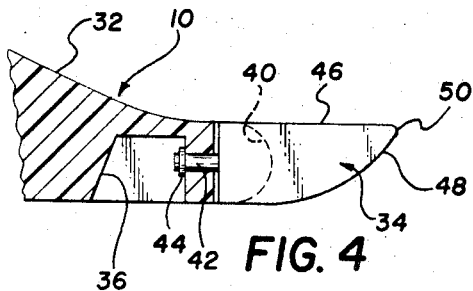
FIG. 4 is a sectional view taken along line 4—4 of FIG. 3.
Figure 3:
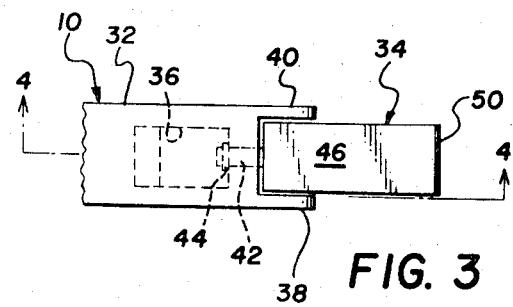
FIG. 3 is a top View of the film stripper finger shown in FIG. 2.

Referring to FIGS. 2–4, film striping finger 10 includes a body portion 32 and a tooth portion 34. Body portion 32 has a recess 36 formed therein and has a pair of lips 38 and 40 extending therefrom. Tooth portion 34 is mounted between lips 38 and 40 on the end of body portion 32 by a stud 42 which extends through a circular opening in the body portion. The tooth portion is held on the body portion by means such as a retaining ring 44, nut and washer or other similar fastening means. Tooth portion 34 has an upper surface 46 which meets a lower surface 48 at a rounded edge 50. During operation, edge 50 is the only portion of the striping finger which normally engages a film roll and, in operation as will be described hereinafter, it tends to separate the leading end of the film from the film roll and direct the film to a threading channel.

When the belt and finger are in their active positions with the cartridge as illustrated in FIG. 1, belt 24 drives the film roll in an unwinding direction and finger tooth portion 34 lifts the leading end of the film from the roll. The film is advanced through a channel formed by one reach of the belt and the adjacent elongate side edge of finger 10. As the film leaves the channel, it is threaded through the usual film drive mechanism, not shown, of the projector, and this threading operation causes stripper finger 10 and drive member 30 to be retracted to their inactive positions in a known manner.

Figure 5:
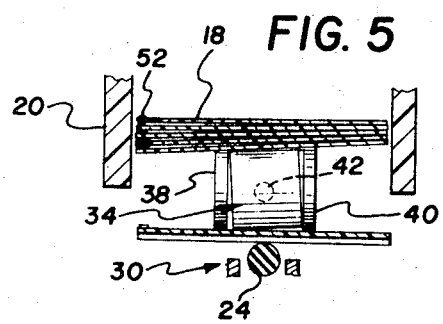
FIG. 5 is a sectional view taken along line 5—5 of FIG. 1.

NOrmally, film will be wound on reel 20 in a uniform manner so that when tooth portion 34 is brought against the outermost convolution of film, edge 50 will lie flat against the film surface. However, in cases where the film has been provided on one-edge portion with a single stripe of magnetic material such as shown in FIG. 5 at 52, there will be an uneven, angular build-up of the film. Now, when tooth portion 34 is brought into contact with the outermost film convolution, it will pivot on stud 42 so that edge 50 will lie flat against the film surface at an angle to the axis of revolution of reel 20. In this manner, a smooth and positive pickup of the leading end of the film is insured even in cases of severe angular buildup. Ears 38 and 40 insure that tooth portion 34 does not rotate too far out of alignment when striping finger 10 is in its inactive position.

Another advantage of the present invention is that tooth portion 34 can be made of a hard, durable material such as hardened steel, carbide or saphire to provide long life without wear that would result in failure to strip film.

The invention has been described in detail with particular reference to a preferred embodiment thereof, but it will be understood that variations and modifications can be effected within the spirit and scope of the invention.

I claim:

1. A stripper mechanism adapted to cooperate with a supply roll of strip material rotatably supported adjacent said mechanism to separate a leading end of said material from said supply roll, said stripper mechanism comprising:

a stripper member having a body portion and tooth portion;

means for mounting said tooth portion on said body portion for at least limited rotation of said tooth portion about an axis contained in a plane which is perpendicular to the axis of rotation of the roll;

means for limiting the amount of rotation of said tooth portion relative to said body portion;

means supporting said stripper member for movement from a first location whereat said tooth portion is out of engagement with said roll to a second location whereat said tooth portion is in engagement with the outermost convolution of said strip material on said roll; and means for moving said stripper member between its first and second positions whereby said tooth portion will align with the surface of the outermost convolution of said strip material regardless of angular buildup of said strip material.

2. A stripper mechanism as defined in claim 1 wherein said mounting means comprises:

means on one of said portions defining a circular opening; and a stud carried by the other of said portions, said stud rotatably extending through said opening.

3. In a projector having a housing, means on said housing for rotatably supporting a roll of film having a leading end, and means defining a film threading path; the improvement comprising a stripper mechanism for separating said leading end from a supported roll and for guiding the leading end along said threading path, said stripper mechanism comprising:

a stripper member having (1) a body portion mounted on said housing for movement in a plane perpendicular to the axis of rotation of a supported film roll and (2) a tooth portion mounted on said body portion for rotation about an axis parallel to said plane, said tooth portion defining a substantially straight edge;

means for limiting the amount of rotation of said tooth portion relative to said body portion; and means for moving said body portion in said plane from a first location whereat said edge of said tooth portion is out of engagement with said roll to a second location whereat said tooth portion is in engagement with the outermost film convolution on said roll.

* * * * *